(12) United States Patent
Brownholtz et al.

(10) Patent No.: US 9,946,802 B2
(45) Date of Patent: Apr. 17, 2018

(54) SITE-WIDE NAVIGATION ELEMENT FOR USER ACTIVITY IN A SOCIAL NETWORKING SITE

(75) Inventors: Elizabeth A. Brownholtz, Andover, MA (US); Joan M. DiMicco, Brookline, MA (US); Casey Dugan, Medford, MA (US); Werner Geyer, Boston, MA (US); Jodi M. Large, Warwick, RI (US); David R. Millen, Boxford, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1651 days.

(21) Appl. No.: 12/017,030

(22) Filed: Jan. 19, 2008

(65) Prior Publication Data
US 2009/0187865 A1    Jul. 23, 2009

(51) Int. Cl.
*G06F 17/30* (2006.01)
(52) U.S. Cl.
CPC .............. *G06F 17/30873* (2013.01)
(58) Field of Classification Search
USPC ................... 714/772; 715/810, 838, 854
See application file for complete search history.

(56) References Cited

U.S. PATENT DOCUMENTS

| | | | | |
|---|---|---|---|---|
| 7,620,902 | B2 * | 11/2009 | Manion ............... | G06Q 10/10 709/204 |
| 7,853,881 | B1 * | 12/2010 | Aly Assal ............ | G06Q 30/02 715/734 |
| 7,958,453 | B1 * | 6/2011 | Taing ................ | H04L 12/1827 709/204 |
| 2005/0198172 | A1 * | 9/2005 | Appelman et al. ........... | 709/206 |
| 2005/0210412 | A1 * | 9/2005 | Matthews et al. ............ | 715/835 |
| 2006/0112339 | A1 * | 5/2006 | Struthers et al. ............. | 715/733 |
| 2006/0242574 | A1 * | 10/2006 | Richardson et al. ......... | 715/530 |
| 2007/0157108 | A1 * | 7/2007 | Bishop .................... | H04L 67/36 715/771 |
| 2007/0174389 | A1 * | 7/2007 | Armstrong et al. ........... | 709/204 |
| 2007/0282950 | A1 * | 12/2007 | Fischer ................ | G06Q 10/10 709/204 |
| 2008/0040673 | A1 * | 2/2008 | Zuckerberg ....... | G06F 17/30867 715/745 |

(Continued)

*Primary Examiner* — Hua Lu
(74) *Attorney, Agent, or Firm* — Steven M. Greenberg, Esq.; CRGO Law

(57) ABSTRACT

Embodiments of the present invention address deficiencies of the art in respect to social networking and provide a method, system and computer program product for site-wide recent action management in a social network. In an embodiment of the invention, a social networking data processing system can be provided. The system can include a social networking application executing in a host server and generating different page views for different users of the social networking application. The system also can include a data store of recent actions for different ones of the users. Finally the system can include a site-wide navigation element displayed in each of the page views for each of the users irrespective of the page view and whether or not the page view is a home page or profile page. In particular, the element can include user links to different profile pages for different users with recent actions.

9 Claims, 2 Drawing Sheets

(56) References Cited

U.S. PATENT DOCUMENTS

| | | | |
|---|---|---|---|
| 2008/0209322 A1* | 8/2008 | Kaufman | G06F 3/0481 |
| | | | 715/716 |
| 2008/0215985 A1* | 9/2008 | Batchelder | G06F 17/211 |
| | | | 715/731 |
| 2009/0030872 A1* | 1/2009 | Brezina et al. | 707/1 |
| 2009/0044142 A1* | 2/2009 | Faris | G06F 17/30873 |
| | | | 715/780 |
| 2009/0077500 A1* | 3/2009 | Perrin et al. | 715/835 |
| 2009/0157473 A1* | 6/2009 | Belz | G06Q 30/02 |
| | | | 705/14.58 |
| 2009/0172112 A1* | 7/2009 | Denner et al. | 709/206 |

\* cited by examiner

SITE-WIDE NAVIGATION ELEMENT FOR USER ACTIVITY IN A SOCIAL NETWORKING SITE

BACKGROUND OF THE INVENTION

Field of the Invention

The present invention relates to the field of social networking and more particularly to navigational pivot points for social networks.

Description of the Related Art

A social network refers to a social structure of nodes each associated with a different person or organization. The interconnections of each node reflect direct relationships between the respective people and organizations such that the directness of a relationship between two persons or organizations associated with respective nodes can be summarized by the path of interconnections between the respective nodes. In this way, any one individual in a social network can evaluate the number and quality of social relationships with others in the network, those relationships ranging from close familial bonds to casual acquaintances.

The advent of the global Internet has changed the way in which social networks can be viewed. Originally, a mere visual tool describing a social phenomenon, computerized social networks facilitate the recognition and expansion of social networks amongst interacting users across the globe. Whereas geographic boundaries previously limited the extent and quality of a given social network, the global Internet enables limitless expansion of the social network based upon a vast set of aware collaborators coupled by the fabric of computer communications.

Commercial computerized social networks have become wildly popular in recent years—especially amongst the younger demographic. Examples include the MySpace™ computer socialized network maintained by MySpace, Inc. of Los Angeles, Calif., LinkedIn™ computerized business network maintained by LinkedIn Corporation of Palo Alto, Calif., and the Facebook™ computerized social network maintained by Facebook of Palo Alto, Calif. Commercial computerized social networks represent social networking services connecting users according to different types of interests in an aggregated view—generally a Web site hosting user contributed content through imagery and commentary.

Commercial computerized social networks allow users to create individual profiles. Each profile can include social media including imagery such as photographs of the user and things relevant to the user. Each profile further can include textual materials such as lifestyle information, or general writings. Notably, users can establish networks of favorite "friends". Favorite friends can be specified manually by a given user and often represent the individuals or organizations most favored by the given user. Each of the favorite friends can be presented in the Web site so as to allow linking to a corresponding profile for the favorite friend. In this way, an end user literally can navigate shared social media in the social network for a given user.

Generally, social networking users can view the recent actions of those in the user's social network. Those actions include status updates, profile changes, and the addition of new content. The recent activities for those in the social network of the user traditionally are provided only in the home page of the user. Other page views in the social network exclude recent activities. Similar, the recent activities of all users in a social network often can be viewed from the home page of the user. For shared media oriented social networks, the recent actions of all users irrespective of the social network of a given user manifests itself in the form of a "most popular" or "most often accessed" content list. In both cases, recent actions are provided from a specific page view. In the event that a user of the social network navigates elsewhere from the specific page, the opportunity to view recent actions will be lost. Users may also have difficulty finding access to the recent actions if they are presented in different ways on profile pages as contrasted with specific pages.

BRIEF SUMMARY OF THE INVENTION

Embodiments of the present invention address deficiencies of the art in respect to social networking and provide a novel and non-obvious method, system and computer program product for site-wide recent action management in a social network. In an embodiment of the invention, a social networking data processing system can be provided. The system can include a social networking application executing in a host server and generating different page views for different users of the social networking application. The system also can include a data store of recent actions of the users. Finally the system can include a site-wide navigation element displayed in a consistent and reliable page-location in each of the page views for each of the users irrespective of the page view and whether or not the page view is a home page, a profile page, or a social-media presentation page. In particular, the element can include user links to different profile pages for different users associated with detected recent actions, or content affected by a detected recent action.

Optionally, each of the user links can include a thumbnail image of a corresponding one of the different users. As another option, the user links each can be activated to respond to a proximity event with a tool-tip indicating a corresponding recent action. As yet another option, the user links can be activated with a context menu providing menu choices to perform actions in respect to a corresponding one of the different users. Even yet further, the user links can be filtered according to date range, or to time range, to reflect recent actions pertaining only to newly added items or updated existing items or to reflect recent actions pertaining only to a specified type of item that has been newly added or updated.

In another embodiment of the invention, a method for site-wide recent action management in a social network can be provided. The method can include loading a page view for a user of a social network, identifying users associated with detected recent actions, creating a site-wide navigation element with a set of user links to corresponding ones of the users associated with the detected recent actions, rendering the page view with the site-wide navigation element, and repeating the loading, identifying creating and rendering for each other different page view requested by the user of the social network. In one aspect of the embodiment, creating a site-wide navigation element with a set of user links to corresponding ones of the users associated with the detected recent actions can include creating a site-wide navigation element with a set of thumbnails providing links to corresponding ones of the users associated with the detected recent actions.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for site-wide recent action management in a social networking system. In accordance with an embodiment of the present invention, a site-wide navigation element can be generated to include a listing of recent actions for users of a social networking system. The site-wide navigation element can be placed in each page view of the social networking system for each user of the social networking system, irrespective of whether the page view is a home page of a user of the social network, or a secondary page view. The recent actions themselves can be textual notifications, or photos of the users associated with the recent actions, or other media items, or links to those items, from among the items stored in the system. In any case, the recent actions can be activated to link to profile pages of respective ones of the users associated with the recent actions.

Figure 1A:
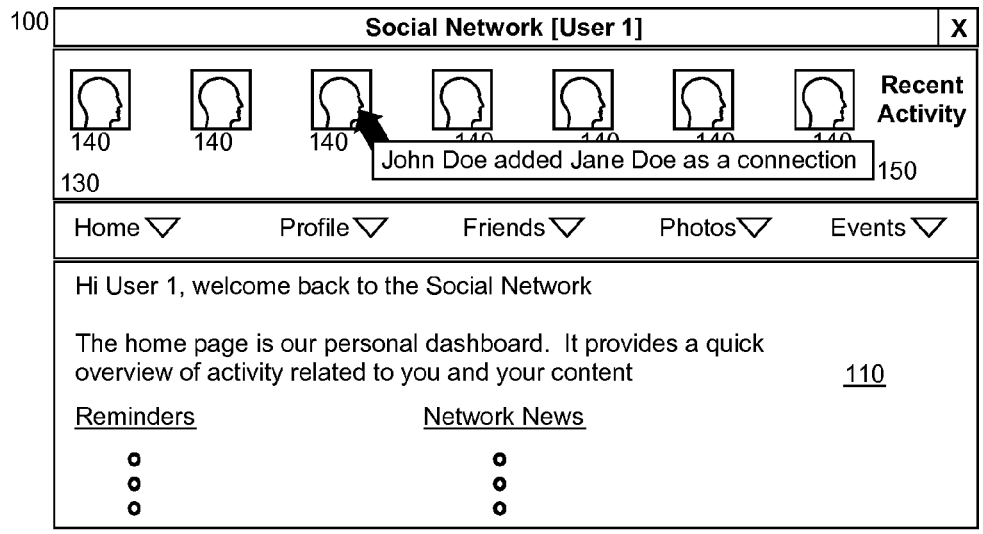
FIGS. 1A and 1B, taken together, are a pictorial illustration of a social networking user interface configured for site-wide recent action management.
Figure 1B:
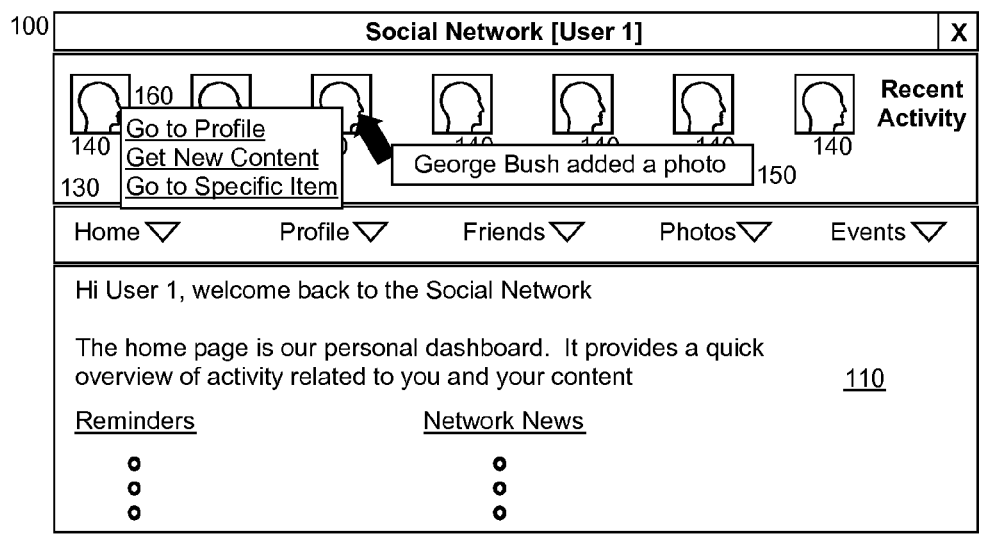

In further illustration, FIGS. 1A and 1B, taken together, are a pictorial illustration of a social networking user interface configured for site-wide recent action management. Referring initially to FIG. 1A, a social networking system user interface 100 can be provided as a view to a social networking system. The user interface 100 can provide a pane for different page views 110 of shared content in the social networking system. A home page and a profile page represent two such page views. Notably, a site-wide navigation element 130 can be provided irrespective of the page view 110.

The site-wide navigation element 130 can provide a set of user links 140 to users of the social networking system associated with respective recent actions. The user links 140 can include, for example, thumbnail images of the users. The user links 140 can be activated to respond to a proximity event like a mouse-over event such that the recent action for a responding user link 140 can result in a tool tip 150 with the recent action for the user. Further, as shown in FIG. 1B, a context menu 160 can be provided for each user link 140 such that an action for the user can be launched from the site-wide navigation element 130. Those actions can include by way of example linking directly to a profile for the user corresponding to the user link 140, retrieving a page view of all new content or all updated content provided by the user corresponding to the user link 140, or retrieving a specific content item for the user corresponding to the user link 140.

The set of user links 140 can include all users of the social networking system regardless of whether a given one of the users is within the social network of the user associated with the user interface 100. However, optionally, the set of user links 140 can be filtered by date range or time range for the corresponding recent actions, by whether or not the recent action relates to a new item or an update to an existing item.

Figure 2:
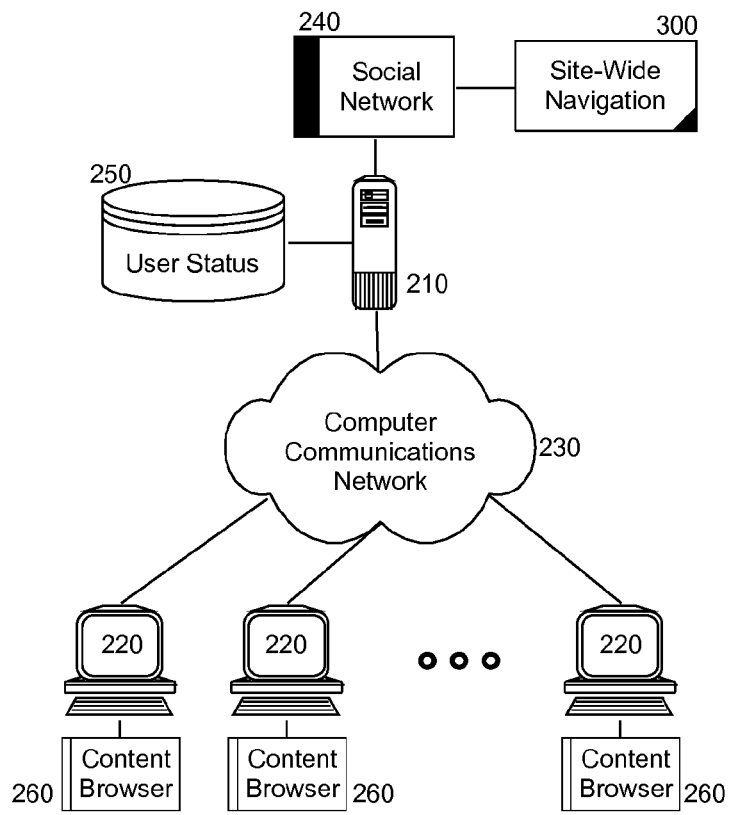
FIG. 2 is a schematic illustration of a social networking data processing system configured for site-wide recent action management; and, FIG. 3 is a flow chart illustrating a process for site-wide recent action management in a social network.

The user interface 100 shown in FIGS. 1A and 1B can be generated within a social networking data processing system. In illustration, FIG. 2 schematically shows a social networking data processing system configured for site-wide recent action management. The system can include a host server 210 configured for communicative coupling to multiple different clients 220 over computer communications network 230. The host server 210 can support the operation of a social networking application 240 through which end users can interact with other users and view content and shared media provided by other users through respective content browsers 260.

Notably, site-wide navigation logic 300 can be coupled to the social networking application 240. The site-wide navigation logic 300 can include program code enabled to generate a site-wide navigation element with user links based upon user status data 250 for each page view requested by each user through a respective one of the content browsers 260. In this regard, the site-wide navigation element can include a set of user-links each corresponding to a different user of the social networking application 250 that has an updated status. The set of user links can include thumbnail images for each of the users and the set of user links can be activated to link to a profile page for a corresponding one of the users.

Figure 3:
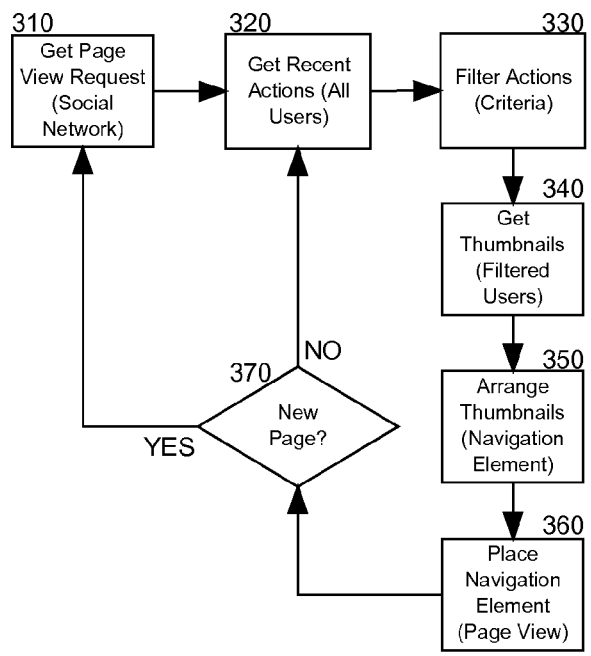

In yet further illustration of the operation of the site-wide navigation logic 300, FIG. 3 is a flow chart illustrating a process for site-wide recent action management in a social network. Beginning in block 310, a page view request can be received in a social network and in block 320, recent actions can be retrieved for all users of the social network. In block 330, optionally the updates can be filtered to produce a set of filtered users and in block 350, a set of thumbnails can be retrieved and activated for the filtered users and arranged into a site-wide navigation element. Thereafter, in block 360 the site-wide navigation element can be placed in the page view. Subsequently, in decision block 370 if a new page view is requested, the process can return to block 310. Otherwise, the process can continue in block 320.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A social networking data processing system comprising:
   a social networking application executing in memory by a processor of a host server and generating different page views for different members of the social networking application on a social network;
   a data store of recent actions by ones of the different members; and,
   an instance of a site-wide navigation element created for each corresponding one of the different members for display in every page of the social networking application, the instance of the navigation element for each corresponding one of the different members comprising a plurality of icons, each icon referring to a different one of the members other than the corresponding one of the different members, each icon further comprising a tool tip appearing in response to a mouse movement in proximity thereto, the tool tip providing multiple different hyper links, a first to a profile page of the different one of the members to which the icon refers, a second to new content provided in association with the different one of the members to which the icon refers, and a third to a specific item stored in connection with the different one of the members to which the icon refers, the navigation element comprising program code enabled upon execution in the memory of the host server to receive from the corresponding one of the different members in a user interface to the social networking application a request to load a page view, and to respond to the request to load the page view by:
   (1) detecting one or more recent actions performed within the social network by the different members;
   (2) identifying each of the different members other than the corresponding one of the different members that are responsible for each of detected recent actions;
   (3) filtering the detected one or more recent actions based upon a criteria;
   (4) creating an instance of the site-wide navigation element for the corresponding one of the different members with an icon for each of the different members identified as being responsible for a corresponding one of the detected recent actions; and,
   (5) rendering the page view for the corresponding one of the different members with the created instance of the site-wide navigation element;
   the instance of the site-wide navigation element remaining present on all page views of the social network requested by the corresponding one of the different members irrespective of a particular page view requested by the corresponding one of the different members.

2. The system of claim 1, wherein the recent actions comprise actions selected from the group consisting of status updates, profile updates, new content, revised contents, replaced content, comments on content, and member actions taken on social media within the social networking application.

3. The system of claim 1, wherein the hyper links are filtered according to date range.

4. The system of claim 1, wherein the hyper links are filtered according to time range.

5. The system of claim 1, wherein the hyper links are filtered to reflect recent actions pertaining only to newly added items.

6. The system of claim 1, wherein the hyper links are filtered to reflect recent actions pertaining only to updated existing items.

7. The system of claim 1, wherein the hyper links are filtered to reflect recent actions pertaining only to a specified type of item that has been newly added or updated.

8. A method for site-wide recent action management in a social network, the method comprising:
   receiving from a corresponding member amongst different members of a social networking application on a social network in a user interface to the social network a request to load a page view;
   responding to the request to load the page view by:
   (1) detecting one or more recent actions performed within the social network by the different members;
   (2) identifying each of the different members other than the corresponding one of the different members that are responsible for each of detected recent actions;
   (3) filtering the detected one or more recent actions based upon a criteria;
   (4) creating an instance of the site-wide navigation element for the corresponding one of the different members with an icon for each of the different members identified as being responsible for a corresponding one of the detected recent actions, each icon referring to a different one of the members other than the corresponding one of the different members, each icon further comprising a tool tip appearing in response to a mouse movement in proximity thereto, the tool tip providing multiple different hyper links, a first to a profile page of the different one of the members to which the icon refers, a second to new content provided in association with the different one of the members to which the icon refers, and a third to a specific item stored in connection with the different one of the members to which the icon refers; and,
   (5) rendering the page view for the corresponding one of the different members with the created instance of the site-wide navigation element;
   the instance of the site-wide navigation element remaining present on all page views of the social network requested by the corresponding one of the different members irrespective of a particular page view requested by the corresponding one of the different members.

9. A computer program product comprising a non-transitory computer usable storage medium storing computer usable program code for site-wide recent action management in a social network, the computer program product comprising:

computer usable program code for receiving from a corresponding member amongst different members of a social networking application on a social network in a user interface to the social network a request to load a page view;

computer usable program code for responding to the request to load the page view by:

(1) detecting one or more recent actions performed within the social network by the different members;

(2) identifying each of the different members other than the corresponding one of the different members that are responsible for each of detected recent actions;

(3) filtering the detected one or more recent actions based upon a criteria;

(4) creating an instance of the site-wide navigation element for the corresponding one of the different members with an icon for each of the different members identified as being responsible for a corresponding one of the detected recent actions, each icon referring to a different one of the members other than the corresponding one of the different members, each icon further comprising a tool tip appearing in response to a mouse movement in proximity thereto, the tool tip providing multiple different hyper links, a first to a profile page of the different one of the members to which the icon refers, a second to new content provided in association with the different one of the members to which the icon refers, and a third to a specific item stored in connection with the different one of the members to which the icon refers; and, (5) rendering the page view for the corresponding one of the different members with the created instance of the site-wide navigation element;

the instance of the site-wide navigation element remaining present on all page views of the social network requested by the corresponding one of the different members irrespective of a particular page view requested by the corresponding one of the different members.

* * * * *